United States Patent

Watson

[15] 3,666,941

[45] May 30, 1970

[54] DIFFERENTIAL FILTER FLUORIMETER

[72] Inventor: Emmett S. Watson, Jupiter, Fla.

[73] Assignee: Laboratory Data Control, Inc., Danbury, Conn.

[22] Filed: Sept. 28, 1970

[21] Appl. No.: 76,073

[52] U.S. Cl.................250/43.5 R, 250/71 R, 250/83.3 UV
[51] Int. Cl. .....................................G01n 23/22
[58] Field of Search ...............250/71 R, 43.5 R; 356/74, 77, 356/98, 246

[56] References Cited

UNITED STATES PATENTS

| | | | |
|---|---|---|---|
| 3,427,273 | 2/1969 | Newing | 250/71 X |
| 2,934,647 | 4/1960 | Blake | 250/43.5 |
| 3,120,608 | 2/1964 | Bird | 250/43.5 |
| 2,621,297 | 12/1952 | Obermaier | 250/43.5 |
| 2,878,388 | 3/1959 | Bergson | 250/43.5 |

*Primary Examiner*—James W. Lawrence
*Assistant Examiner*—C. E. Church
*Attorney*—Buckles and Bramblett

[57] ABSTRACT

There is disclosed a double beam differential fluorimeter requiring no light chopper and characterized by unusually small cell volume and high optical efficiency. The instrument comprises a bifurcated conical light tunnel having highly reflecting internal surfaces. A transparent tube passes through each side of the bifurcated light tunnel, one for containing a sample fluid, the other for containing a reference fluid. A light source directs ultraviolet radiation into the large end of the conical tunnel. A pair of photodetectors are positioned at the small end of the tunnel, together with an ultraviolet blocking filter. Each detector is responsive, respectively, to fluorescence from the sample and reference fluids. An electrical bridge circuit compares the intensities of the fluorescence derived from the sample and reference fluids.

9 Claims, 7 Drawing Figures

Patented May 30, 1972

INVENTOR.
Emmett S. Watson
BY
Buckles + Bramblett
ATTORNEYS.

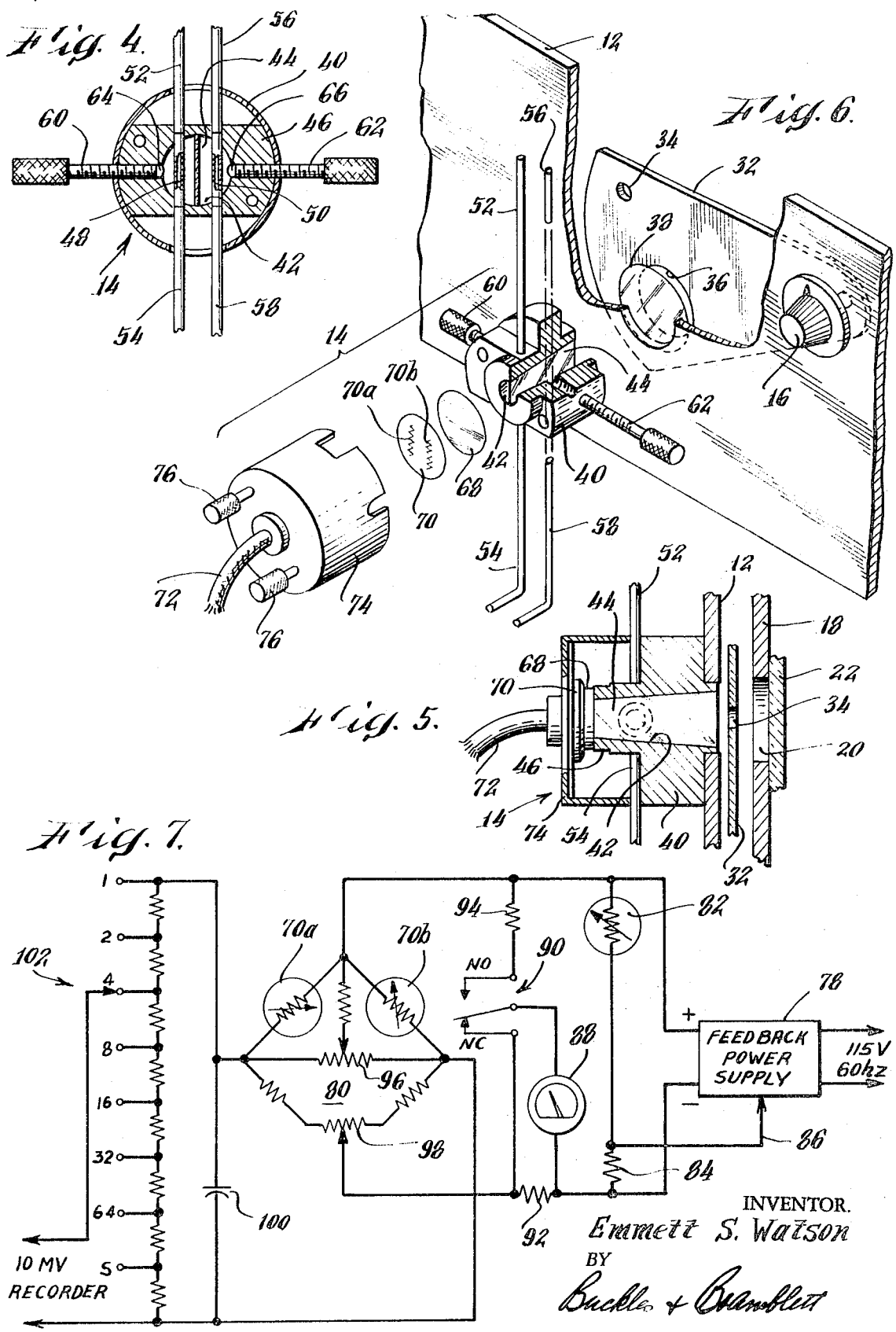

DIFFERENTIAL FILTER FLUORIMETER

BACKGROUND OF THE INVENTION

Fluorimetry is a well known analytic technique. It has its basis in the fact that certain molecules absorb radiation of one wavelength and, almost simultaneously, emit fluorescence radiation of a longer wavelength. Instruments which measure this fluorescence give valuable information for quantitive chemical analyses and also for theoretical studies of the electronic and physical configuration of molecules. Although a number of fluorescence measuring instruments are known to the prior art, they have various deficiencies which it would be desirable to overcome or improve. For example, most such instruments have relatively large cell volumes, which makes it difficult to measure the fluorescence of small volume samples. Also, such instruments are usually of the single beam type. If they are double beam instruments, they commonly have only one liquid cell chamber and normally require either a light chopper or matched photomultipliers. Prior art instruments also have limited ability to detect small solute flourescence in the presence of high "blank" fluorescence because of limited photometer stability. They often require either high power sources or expensive photomultipliers and they may require ratio recorders, mechanical zero, range change, etc.

Accordingly, it is a primary object of the present invention to provide a fluorimeter which has high sensitivity with small flow cell volume; which has twin flow cells and differential readout to compensate for variations in solvent fluorescence; which has high blank fluorescence capability to permit sensing small solute fluorescence in the presence of high solvent fluorescence; which has high optical efficiency to permit the use of a low pressure mercury source and a photoconductive detector which is inexpensive and compact; which has electrical range and zero adjustments for remote control convenience; and which has direct electrical readout without requiring a ratio recorder

SUMMARY OF THE INVENTION

In accordance with the present invention there is provided apparatus for differential filter fluorimetry which comprises a source of excitation radiation and a longitudinally bifurcated light pipe or tunnel having highly reflective internal surfaces. Means are provided for placing a sample material within one half of the light pipe and a reference material within the other half of the light pipe. Excitation radiation is directed into one end of the light pipe to impinge upon the sample and reference materials with substantially equal intensities. At the second end of the light pipe, means are provided which are substantially solely responsive to fluorescence radiation from each half of the light pipe for indicating the relative intensities thereof.

BRIEF DESCRIPTION OF THE DRAWINGS

In the drawings,

FIG. 4 is an enlarged cross section taken substantially along the line 4—4 of FIG. 2;

FIG. 5 is an enlarged cross section taken substantially along the line 5—5 of FIG. 2;

FIG. 6 is an exploded view of the flow cell portion of the invention; and

FIG. 7 is a schematic electrical diagram of the instrument of the invention.

DESCRIPTION OF THE PREFERRED EMBODIMENT

Figure 1:
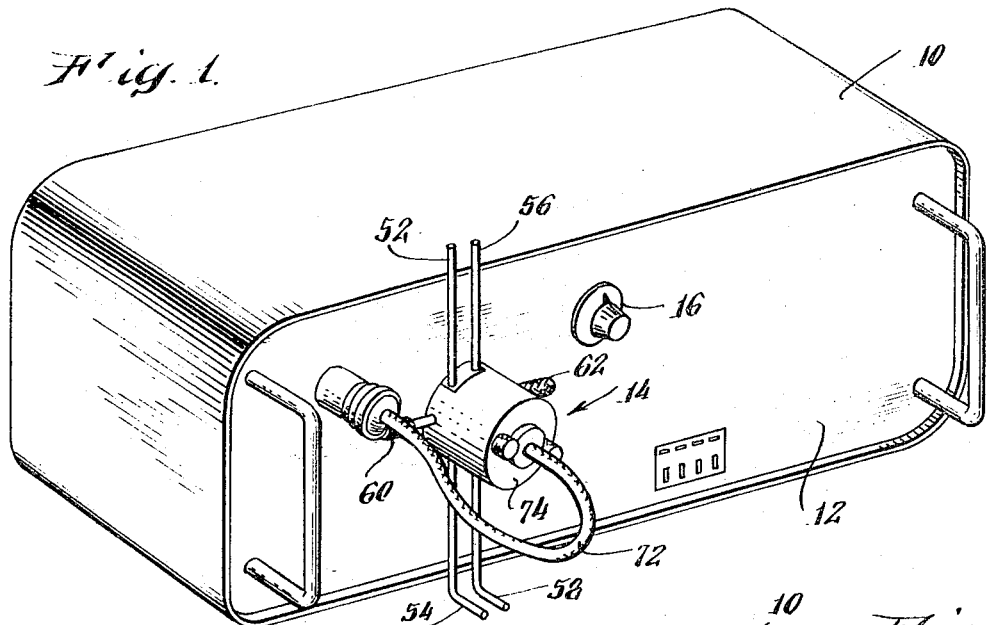
FIG. 1 is a perspective view of the optical unit of an instrument in accordance with this invention.
Figure 2:
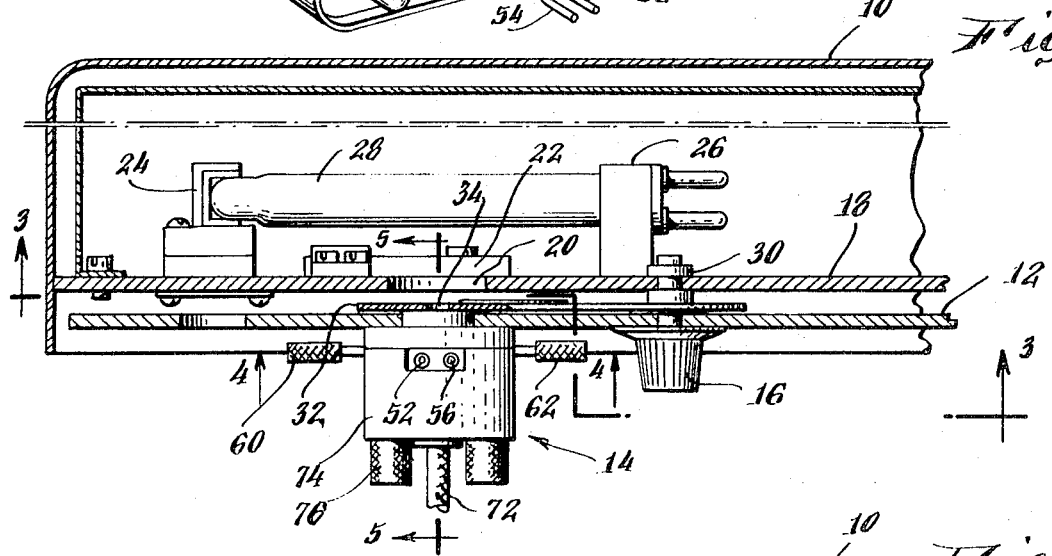
FIG. 2 is an enlarged, partial cross section taken through a horizontal plane of the instrument of FIG. 1, along the line 2—2 of FIG. 3.

With particular reference to the drawings, there is illustrated in FIG. 1 a perspective view of an instrument in accordance with this invention comprising a substantially rectangular housing 10 closed by a front panel 12. Mounted on the front panel 12 is a flow cell assembly 14 and a control knob 16. Directly behind, but spaced from, panel 12 is an inner chassis board 18. The chassis board defines an aperture 20 therethrough which is aligned with the flow cell assembly 14. An ultraviolet filter 22 is mounted against the aperture. Mounted directly behind the aperture 20 and filter 22 by means of suitable clamps 24, 26 is a low pressure mercury lamp 28. The lamp 28 and filter 22 are designed to emit radiation through the aperture 20 in the wavelength region of 320 – 400 nm.

Figure 3:
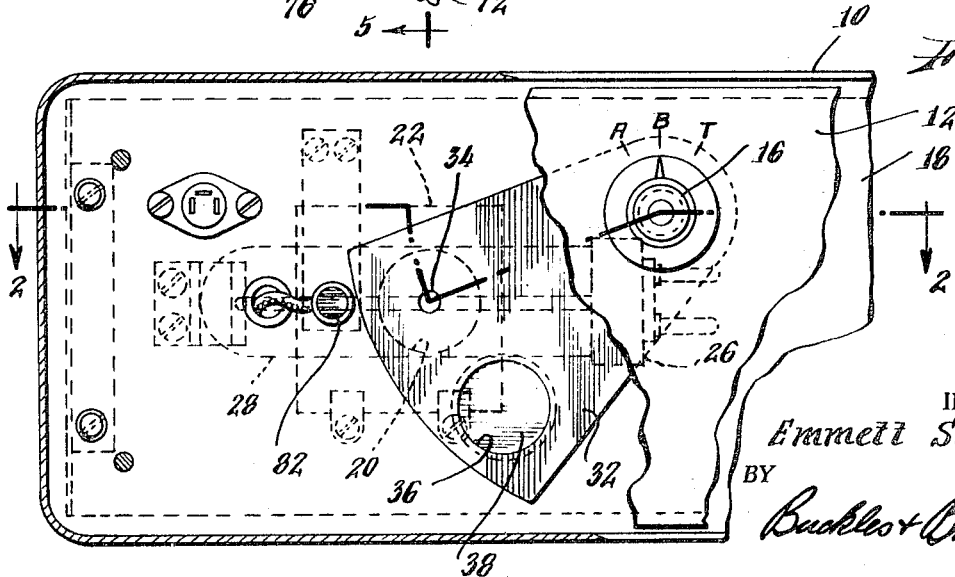
FIG. 3 is a cross section taken substantially along the line 3—3 of FIG. 2.

The control knob 16 is, as shown in the drawings, mounted to one side of the flow cell assembly 14. It controls a shaft 30 which extends between the panel 12 and chassis board 18 and carries thereon a shutter blade 32. The shutter may be placed in any of three positions by rotation of knob 16 to the positions "A," "B" and "T" marked on panel 12, as shown in FIG. 3. With knob 16 turned to the "A" position, the shutter blade 32 is below and completely out of alignment with aperture 20. When knob 16 is turned to position "B," as illustrated in FIG. 3, a smaller aperture 34 in the blade is introduced between aperture 20 and flow cell assembly 14. With the knob turned to the position "T," an enlarged opening 36 backed by a weakly fluorescent screen 38 is positioned between the aperture 20 and the flow cell assembly 14.

The construction of the flow cell can best be seen in FIGS. 4–6. It comprises a substantially disc shaped aluminum body 40. The body 40 is mounted in panel 12 and defines therethrough a conical passageway or tunnel 42. As will be apparent from FIG. 5, the passageway 42 is aligned with its large end in the direction of aperture 20. The surface of passageway 42 is polished so as to be highly reflecting, an it is bifurcated by means of a vertical metal plate 44 which extends longitudinally therethrough, dividing the passageway into two portions. The surfaces of metal plate 44 are also highly polished. The outer end of body 40 is cut away so as to form a substantially rectangular boss 46 containing the small diameter end of the conical passageway 42.

The boss 46 is drilled vertically through each half of the bifurcated passageway 42. Mounted within the drilled openings are flow cell chambers 48, 50. These flow cell chambers are short lengths of glass tubing cemented into place as illustrated in FIG. 4. Communicating with the ends of flow cell chamber 48 are fluid delivery lines 52, 54 and similar lines 56, 58 communicate with flow cell chamber 50. In one actual embodiment, the fluid delivery lines are of stainless steel. However, they may be of any suitable material, including plastic or glass, which is compatible with the fluid to be carried.

The boss 46 is also drilled and tapped from the sides, as shown in FIG. 4, to receive thumb screws 60, 62. Each thumb screw carries at its end fluorescent bead 64, 66, which may be screwed into the passageway 42 for reasons to be later explained.

Mounted against the small end of passageway 42, is an ultraviolet blocking filter 68. Positioned against filter 68 to receive radiation therethrough is a dual photocell 70 so positioned that each of its photosensitive elements 70a, 70b, is positioned at the end of a different half of bifurcated passageway 42. Electrical connections to the photocell 70 are made through a suitable cable 72 and the flow cell assembly is completed by a cap 74 retained by screws 76.

The electrical circuit of the apparatus of this invention is shown schematically in FIG. 7. It comprises a feedback power supply 78 which supplies power to a Wheatstone bridge 80 containing the elements 70a, 70b of the dual photocell. Connected across the power supply output is a photocell 82 and resistor 84. The tap between them provides feedback connection 86. The photocell 82 is physically positioned to "view"

the ultraviolet lamp 28. A meter 88 is connected to a two position switch 90 such that, in the normal switch position which is illustrated, it is in parallel with a resistor 92 in series with the power supply. Actuation of switch 90 connects meter 88 across the power supply through resistor 94. Included in the Wheatstone bridge 80 are a "zero" potentiometer 96 and a "-track" potentiometer 98. The output from bridge circuit 80 is filtered by capacitor 100, is attenuated by range selector switch 102, and is then supplied to a recorder (not illustrated).

Various elements of the disclosed apparatus serve to obtain the objectives of this invention. These include:

1. Use of a "cone condenser" (conical passageway 42) to match a large area, low brightness source to a small area detector;
2. Bifurcating the cone condenser to form two symmetrical beams;
3. Providing independent blank adjustment for both beams by varying the optical coupling between a phosphor and each beam;
4. Using a dual photoconductive cell for economy and good tracking in the double beam photometer system;
5. Compensating for excitation lamp brightness changes by automatically varying photometer bridge voltage and, thus, sensitivity.

The ultraviolet lamp 28 is a low pressure, hot cathode mercury lamp with a phosphor coating which emits near ultraviolet light of approximately 360 nm. Light from the lamp passes through visible light blocking filter 22 and, when shutter 32 is in the "A" position, directly into the large diameter end of conical passageway 42. As this passageway has a highly reflecting internal surface and is bifurcated by metal plate 44 which also has highly reflecting surfaces, the excitation light will impinge on the corresponding flow cell chambers 48, 50 by multiple reflection, as well as by direct transmission. Fluorescence emission from these chambers then passes through the ultraviolet blocking filter 68 and impinges on the corresponding photosensitive elements 70a, 70b of dual photocell 70. The bifurcated cone condenser increases both the intensity of the excitation on the cell chambers and the efficiency of gathering emitted light. At the same time, it divides the optical system into two beams.

In order to compensate for background ("blank") fluorescence and to establish an initial illumination level on the photocell 70, the two blank adjusting thumb screws 60, 62 are provided. The fluorescent beads 64, 66 on the ends of these screws are excitable by the ultraviolet light, and emit in the visible region to which the dual photocell 70 is responsive. Optical coupling between each bead and the corresponding beam depends on the depth to which each adjusting screw is turned into its threaded bore.

When the mode switch 16 is in position "A," the full source aperture is exposed for high sensitivity, as just explained. In position "B," the shutter 32 is shifted to the position illustrated in FIG. 3, reducing the aperture to the size of small aperture 34. This position would be utilized for large fluorescent signals. In test position "T," the weakly fluorescent screen 38 is placed over the source aperture.

Due to the extreme sensitivity of the disclosed apparatus, and the small size of the flow cells, it is particularly adapted for use as a detector of a liquid chromatograph. Accordingly, its operation will be described in this context although it will be understood that its applications are not in fact so limited.

Referring to the electrical schematic of FIG. 7, the elements 70a, 70b of dual photocell 70 function as light sensitive resistors whose resistance is substantially inversely proportional to the intensity of the visible light impinging upon them. The zero potentiometer 96 adjusts the initial bridge balance for zero output, thus establishing the chromatogram base line at recorder zero. When a fluorescent solute passes through one of the flow cell chambers, the amount of visible light reaching the corresponding photocell element is increased. This unbalances the bridge, creating an output voltage which is recorded as a chromatographic peak. Adjustment of track potentiometer 98 equalizes the sensitivity of the two sides of the bridge by compensating for various tolerance factors such as mismatch between photocell elements.

As previously explained, photocell 82 is positioned to view of the ultraviolet lamp 28. In cooperation with the feedback power supply 78, it functions to compensate for variations in excitation lamp brightness which would otherwise affect the range sensitivity of the readout. For example, the lamp brightness might be reduced as, for example, by temperature change or by aging. If the bridge excitation voltage were fixed, this would result in a reduced peak height for a given fluorescence intensity. However, photocell 82 senses this reduction in lamp brightness and sends a feedback signal through connection 86 to the power supply 78. The power supply automatically increases the bridge voltage, and thus the bridge sensitivity, in just the right amount to compensate for the loss in ultraviolet excitation intensity.

With switch 90 in the illustrated position, the meter 88 measures the bridge current. Since this is a function of the average illumination falling on the photocell elements 70a, 70b, the meter reading indicates the average background fluorescence of the two beams, including that from the blank adjusting screws 60, 62. In this position, the meter 88 is used as an indicator for adjusting the blank adjusting screws.

When switch 90 is actuated, the meter 88 is connected to read the bridge voltage. Since the bridge voltage is a function of the lamp brightness, due to the operation of the feedback power supply 78, the meter reading indicates lamp brightness. As the lamp ages, the meter reading will approach full scale indicating that the lamp should be replaced.

To initially adjust the instrument for operation with either one or two liquid streams, the knob 16 should first be turned to the "T" position wherein the fluorescent screen 38 is positioned at the inlet of the cone condenser. The zero control potentiometer 96 should be adjusted to approximately mid scale. Both thumb screws 60, 62 are backed out and the system is allowed to equilibrate in temperature and permit bubbles to disappear from the flow cells. The recorder chart zero position is determined with range switch 102 in the "S" position, after which the range switch is set to a moderate sensitivity setting. The track potentiometer 98 is then adjusted until the recorder reads approximately zero. Thereafter, the knob 16 is switched either to the "A" position for higher sensitivity or to the "B" position for lower sensitivity. The two blank adjusting screws 60, 62 are then screwed in or out until the meter 88 reads within the desired range and the recorder reads approximately zero. Thereafter, the instrument is ready for operation in recording a chromatographic analysis or other application.

The instrument described above is responsive to solutes which have significant fluorescence emission in the visible region 400–700 nm when excited by ultraviolet light in the wavelength region 320–400 nm. The sensitivity to a given solute will depend not only on concentration but also on such factors as fluorescence yield, possible quench effects, effects of nonfluorescent interfering solutes which absorb strongly in the ultraviolet, etc.

One of the features of the disclosed invention is the ability of the instrument to operate at high sensitivity in the presence of high solvent background fluorescence. In addition, if this background fluorescence changes, such as during a gradient elution, the twin cell feature permits the use of a compensating reference stream of solvent.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. Apparatus for differential filter fluorimetry which comprises: a source of excitation radiation; a longitudinally bifurcated substantially conical light tunnel having highly reflective internal surfaces; means for placing a sample material within a first half of said light tunnel; means for placing a reference material within the second half of said light tunnel; means for directing said excitation radiation into a first end of said light tunnel to impinge upon said sample and reference materials with substantially equal intensities; and means at a second end of said light tunnel substantially solely responsive to fluorescence radiation from each of said first and second halves for indicating the relative intensities thereof.

2. The apparatus of claim 1 wherein said first end is larger than said second end.

3. The apparatus of claim 1 wherein said responsive means comprises a power supply and a Wheatstone bridge energized by said power supply for producing an output signal indicative of said relative intensities, said Wheatstone bridge including first and second photosensitive elements responsive, respectively, to radiation from said first and second halves.

4. The apparatus of claim 3 wherein said power supply is of the feedback type and said responsive means includes a third photosensitive element responsive to the intensity of said excitation radiation source to supply a corresponding feedback signal to said power supply.

5. The apparatus of claim 1 wherein said source comprises: a lamp; and adjustable aperture defining means intermediate said lamp and said light tunnel.

6. The apparatus of claim 5 wherein said aperture defining means comprises: an opaque member defining a fixed aperture therein; and movable shutter means adjacent said fixed aperture.

7. The apparatus of claim 6 wherein said movable shutter means defines a supplemental aperture smaller than said fixed aperture and said shutter means is movable between a fixed position fully exposing said fixed aperture and a second position wherein said supplemental aperture is aligned with said fixed aperture.

8. Apparatus for differential filter fluorimetry which comprises: a source of excitation radiation; a longitudinally bifurcated light tunnel; means associated with said light tunnel for adjustably positioning supplemental fluorescent material in the path of said excitation radiation; means for placing a sample material within a first half of said light tunnel; means for placing a reference material within the second half of said light tunnel; means for directing said excitation radiation into a first end of said light tunnel to impinge upon said sample and reference materials with substantially equal intensities; and means at a second end of said light tunnel substantially solely responsive to fluorescence radiation from each of said first and second halves for indicating the relative intensities thereof.

9. The apparatus of claim 8, wherein said positioning means comprises first and second screw means positioned, respectively, in said first and second halves, each of said screw means supporting said supplemental fluorescent material thereon.

* * * * *